Dec. 28, 1965  J. A. PAGE  3,225,718
ROLL CUTTER
Filed Aug. 3, 1962  2 Sheets-Sheet 1
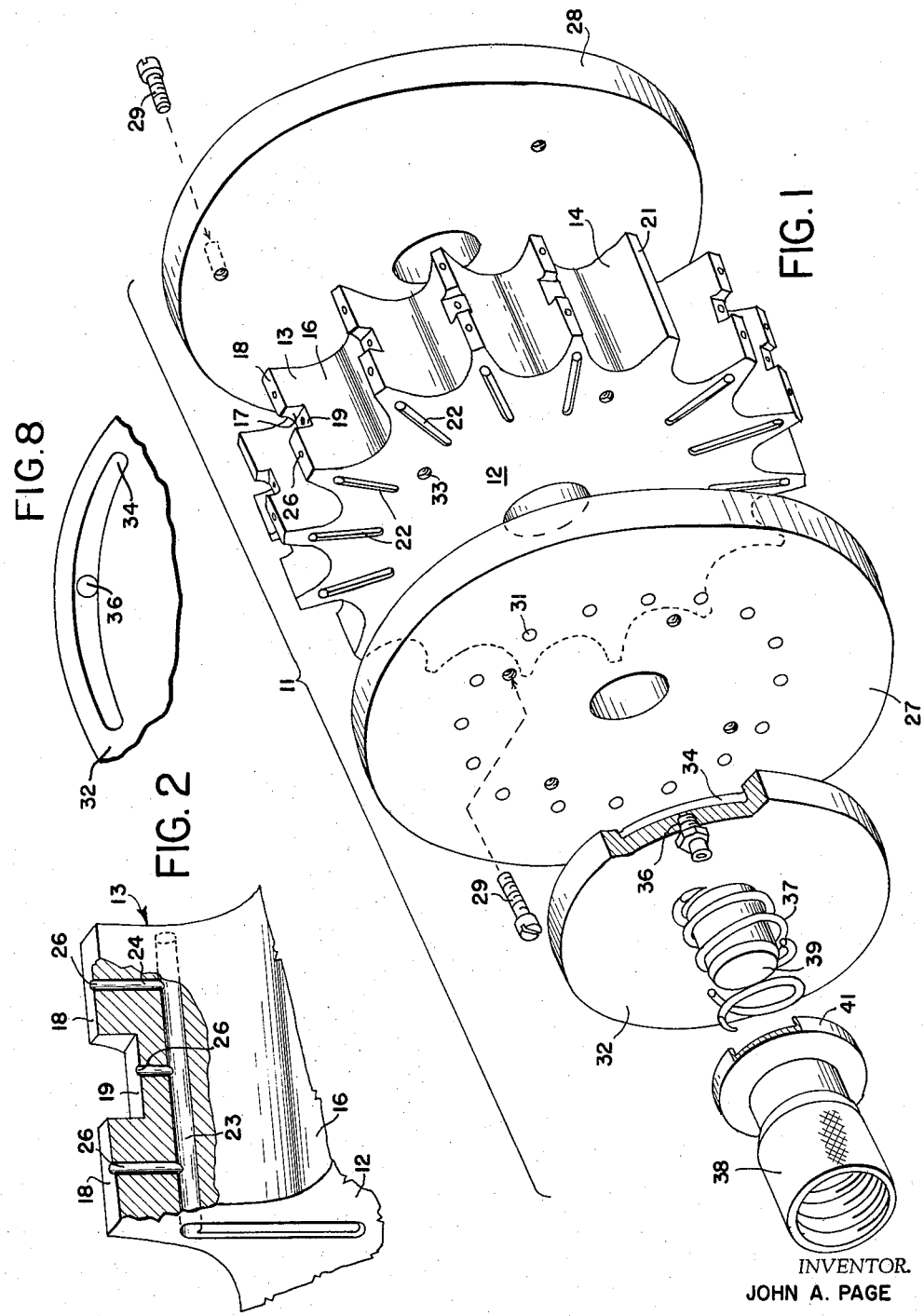
INVENTOR.
JOHN A. PAGE
BY Harold D. Jastram
ATTORNEY Dec. 28, 1965   J. A. PAGE   3,225,718
ROLL CUTTER
Filed Aug. 3, 1962                                           2 Sheets-Sheet 2
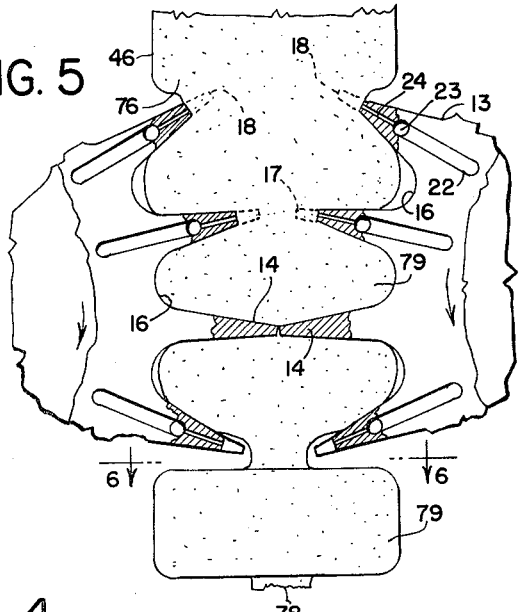
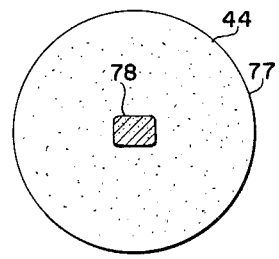
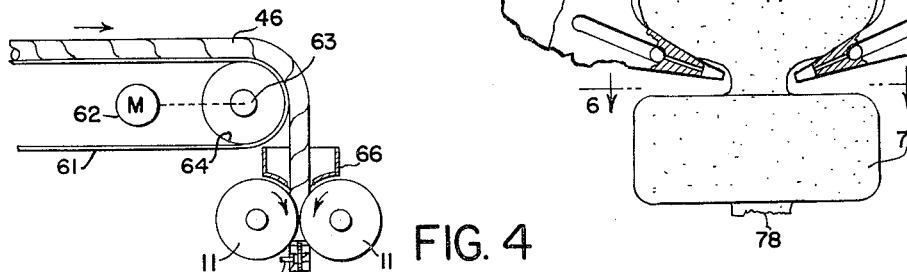
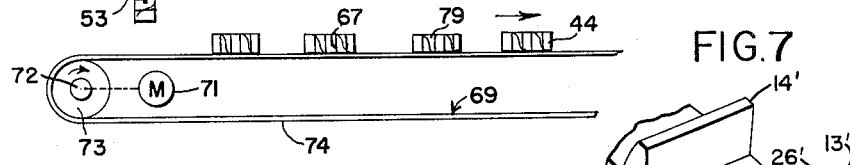
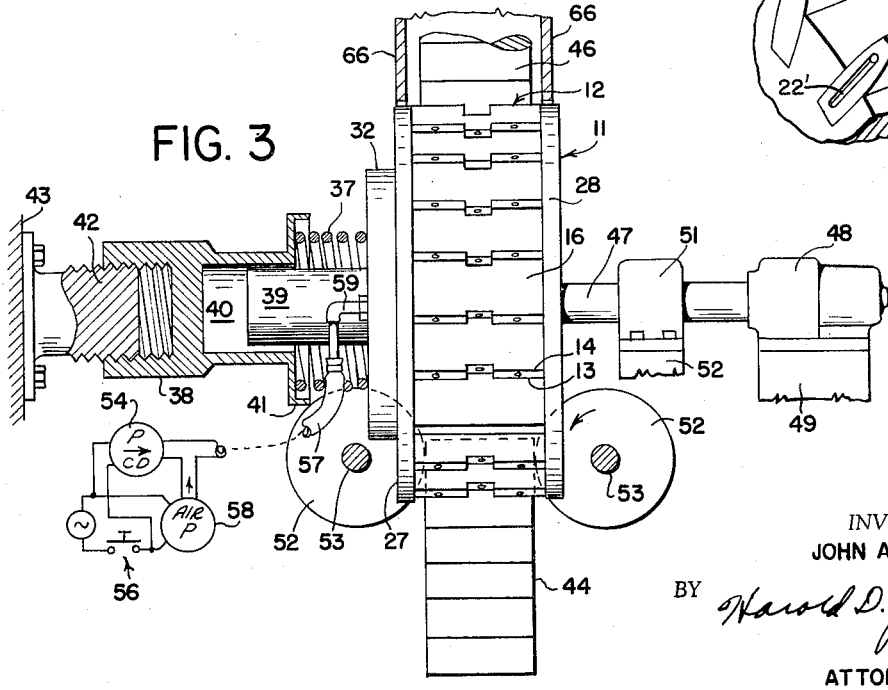
INVENTOR.
JOHN A. PAGE
BY Harold D. Jastram
ATTORNEY United States Patent Office 3,225,718
Patented Dec. 28, 1965

3,225,718
ROLL CUTTER
John A. Page, Minneapolis, Minn., assignor to General Mills, Inc., a corporation of Delaware
Filed Aug. 3, 1962, Ser. No. 214,616
7 Claims. (Cl. 107—69)

This invention relates to an apparatus for processing food products, and more particularly to an apparatus for molding dough from a layer or rope of dough product.

Problems of handling arise in the marketing of certain dough type products such as sweet rolls due to the fact that such products are normally marketed in the form of individual rolls. Packaging individual rolls by hand is a time consuming and expensive operation, especially where large quantities of packaged products are needed with a number of rolls packed in each package.

It is therefore an object of the present invention to provide a new and improved apparatus for molding dough products.

Another object of the invention is to provide a new and improved apparatus for forming cylinders of pastry dough composed of individual rolls.

It is another object of the present invention to provide a new and improved apparatus for forming cylinders of pastry dough composed of individual rolls connected by a web of the dough material.

A yet further object of the present invention is to provide a new and improved apparatus for forming cylinders or chubs of dough composed of individual rolls connected by a web of unsevered dough and for injecting oil or some type of vegetable shortening between the individual rolls to prevent adhesion of the individual rolls to each other.

A further object of the present invention is to provide a new and improved apparatus for continuously forming a series of cylinders of dough composed of individual rolls from a rope or sheet of dough moving along a conveyor.

Another object of the present invention is to provide a new and improved apparatus for forming a series of dough chubs or cylinders having individual rolls from a moving sheet or rope of dough and depositing the dough cylinders in spaced relationship on a conveyor.

With these and other objects in view, the present invention concerns a dough forming or molding apparatus having two rotary cutters with engaging severing and scoring blades. A strip or rope of dough is introduced between the rotary cutters from a conveyor which conveys the rope along the longitudinal axis of the rope of dough. The engaged cutters sever the rope of dough into segments and score the individual segments or cylinders of severed dough at predetermined intervals to produce rolls in the cylinder. The individual severed cylinders or chubs of dough pass between the cutters and are deposited, with the assistance of a discharge device, on a conveyor. The chubs or cylinders of dough are discharged in spaced relationship on the conveyor. An oil system is provided so that as the individual cylinders of dough are being scored by the cutters, oil is inserted between the individual rolls of the dough cylinder to lubricate the particular rolls. This injection of oil between the individual rolls of the cylinder prevents adhesion of the individual rolls to each other.

A complete understanding of the invention may be obtained from the following detailed description of specific embodiments thereof, when read in conjunction with the drawings, in which;

FIGURE 1 is an exploded isometric view of a single dough cutter;

FIGURE 2 is a fragmentary isometric view of a single scoring blade of the cutter disclosed in FIGURE 1;

FIGURE 3 is a front view of the dough forming apparatus showing the cutter, a manifold system, an oil system, and drive means;

FIGURE 4 is a side view of the dough forming apparatus disclosed in FIGURE 3 showing input and discharge conveyors in association with the cutters disclosed in FIGURES 1 and 3;

FIGURE 5 is a fragmentary cross sectional view showing the scoring and cutting teeth of the cutters disclosed in FIGURE 1;

FIGURE 6 is a cross section of a cylinder or segment of rolled dough taken along line 6—6 of FIGURE 5 showing a web which connects the individual rolls of the dough cylinders or chubs.

FIGURE 7 is a fragmentary view showing an alternate embodiment of the scoring and cutting teeth of the cutter shown in FIGURE 1; and FIGURE 8 is a fragmentary end view of the manifold blade shown in FIGURE 1.

Refer first to FIGURE 1 of the drawings which shows an exploded view of a dough cutter. The cutter, generally designated by the numeral 11, is composed of a number of individual parts. The central portion of the cutter 11 is a roller 12 having a number of scoring blades or teeth 13 and severing blades or teeth 14. These scoring blades 13 and severing blades 14 extend radially from the central portion of the roller 12. The blades 13 and 14 may be placed radially on the roller 12 in a number of ways. As shown in FIGURE 1 the blades 13 and 14 may be milled from the periphery of the roller itself. Where the blades 13 and 14 are formed by milling, the material of the roller is cut away to form a pocket 16 between the respective blades of the roller. The pockets 16 may be of any shape or depth depending upon the particular application of the cutter 11. The blades 13' and 14' may also be placed in the roller 12 by simply fixing individual radially extending blades on the periphery of a central roller, see FIGURE 7. In this case milling of the roller periphery itself will not be necessary to form the cups since the individually attached blades 13' and 14' form the pocket 16 between the blades.

The function and purpose of the scoring blades 13 and the severing blades 14 is quite different. The scoring blades 13 each contain a notch 17 in the center of the blade (see FIG. 1). This notch is placed in the blade 13 to prevent complete servering of the dough product as a dough product moves between engaging blades 13 of the cutter 11 (see FIG. 5). Surface 18 of blade 13 provides the cutting surface for the scoring blades 13 and surface 19 at the bottom of notch 17 also provides a cutting surface. However due to the presence of notch 17 a certain portion of the dough which fills the notch 17 will not be completely severed by the engaged blades 13 of an identical cutter as the scoring blades 13 of the identical cutters engage. The cutting surfaces 18 and 19 may actually be flat surfaces as shown in the drawings to provide adequate cutting capability due to the characteristics of pastry dough. The dough is severed and scored as the dough is pinched or squeezed between the cutting surfaces 18 and 19 of matching blades. The individual rolls 79 remain connected by a web 78.

The severing blades 14 on the other hand are each a simple radially extending servering blade having a single cutting surface 21 with no notch or identation in the cutting surface. Thus when a severing blade 14 engages a similar severing blade 14 of an adjacent cutter 11, a dough sheet or rope which is passing between a pair of the cutters is severed by the engagement of surfaces 21 of one severing blade 14 with the cutting surface 21 of the adjacent severing blade. (See FIG. 5.)

The scoring and severing blades 13 and 14 respectively are placed about the periphery of the cutter so that the dough sheet or rope which is passing between a pair of the cutters is completely severed at predetermined intervals by the engaging severing blades 14. FIGURE 5 discloses the engaged severing blades 14 which are severing a rope of dough 46.

Vegetable oil or liquid shortening is utilized in the severing and scoring process. Consequently a system is provided to introduce the vegetable oil between the individual rolls 79 of the dough cylinders 44. Channels 22 are milled in the end of roller 12 so that oil may flow along the length of channels 22. Channels 22 communicate with a passage 23 (see FIG. 2), in each of the scoring blades 13 so that oil passes from the channel 22 through the passages 23 and 24 and is deposited between the individual rolls 79 of the severed segment or cylinder of dough 44. Oil passages 24 terminate in openings 26 at the cutting surfaces of the individual scoring blades 13. In the modified construction shown in FIG. 7 channels 22' are similarly supplied with oil and similarly communicate with passages terminating in openings 26'.

End plates 27 and 28 are provided for the cutter 11. These end plates define the limits of the cups 16. When the plates 27 and 28 are bolted by bolts 29 onto the sides of roller 12, the plates 27 and 28 define the capacity of the individual cups 16 of the cutter 11.

Plate 27 in addition to terminating the cups 16 also cooperates with a manifold 32 so that oil may be introduced into the channels 22, passages 23, and passages 24. The end plate 27 has a number of apertures 31 which communicate with channels 22 to define a passageway from the manifold 32 through plate 27 along channel 22 and through the scoring blades 13. The plate 27 as noted is rigidly connected to the roller 12 by bolts 29 which screw into the threaded holes 33 in the side of the roller 12.

Since oil or shortening is used in the operation of the dough cutter, a device is necessary to introduce oil or shortening into apertures 31, channels 22, passages 23, and passages 24. A manifold 32 having a slot 34 is used to introduce or direct oil from an oil source 56 through the apertures 31 in plate 27 and into the channels 22 and passages of the scoring blades 13. The slot 34 in manifold 32 is positioned in a particular place in the plate 32 with respect to the plate 27 so that oil which is introduced into the slot 34 through an opening 36 is directed into a selected or limited number of the apertures 31, see FIGURES 1 and 8. Introduction of oil into the channels 22 and the passages of scoring blade 13 is limited to the blades 13 which are about to engage or are presently engaging similar blades of a cooperating cutter. See FIG. 5 for identification of these particular blades. As the cutter 11 rotates, the slot 34 successively communicates with new and different holes 31 which correspond with different scoring blades 13. Consequently, the oil which is introduced into the slot 34 of manifold 32 selectively flows through the blades 13 which are actively engaged in scoring the dough product (dough rope 46), which is passing between a pair of cutters 11. The apertures 31 successively come into communication with the slot 34 in manifold 32 since the cutter 11 including the plate 27, the roller 12, and the plate 28 rotate with respect to the manifold 32. Manifold 32 is stationary, however, and frictionally engages plate 27. Slot 34 is made of any length desired so that at any given moment a particular number of apertures 31 in plate 27 are communicating with the slot 34 to receive oil being pumped into the slot 34 through aperture 36.

Since there is relative movement between the plate 27 and the manifold 32, a pressure biasing arrangement is used to prevent the oil, which is under pressure, from leaking out of slots 34 and being lost from the system. The plate 32 is machined very accurately on the face which contacts the plate 27 to provide a minimum of irregularities for the escape of oil from the slot 34. To insure that the manifold 32 engages the plate 27 at all times with adequate pressure, a coil spring 37 is mounted between the manifold 32 and an adjusting collar 38. See FIG. 3 for a cross sectional view of this particular collar and spring arrangement. The coil spring 37 fits over a stationary stud 39 on manifold 32 to prevent the coil spring 37 from disengaging the manifold 32. The spring 37 fits into a flange 41 of the adjusting collar 38 and the end of the spring 37 is captured by this collar 41 to provide adequate control of the spring 37. When the spring 37 is adequately tensioned, the stud 39 actually fits within an opening 40 in the collar 38 (see FIG. 3). One end of the collar 38 is threaded so that it may be adjusted along the length of a threaded stud 42 shown in FIGURE 3. Threaded stud 42 is fixed on a stationary mount 43 so that rotation of the adjusting coupling 38 results in axial movement of the collar 38 to vary the tension in the spring 37. Thus, the pressure which exists between the plate 27 and the manifold 32 may be accurately adjusted. The plate 27, roller 12, and plate 28 are not movable axially along the rotational axes of the cutter 11 due to the cutter drive system.

Refer again to FIGURE 3 of the drawings. FIGURE 3 is a front view of the apparatus which is used to score and sever chubs or cylinders 44 of dough from a rope of dough 46. The rope 46 may be a sheet of dough depending upon the particular product which is being produced. The cutters 11 are each mounted for rotation on their respective shafts 47 which are driven by motor 48. Motor 48 is mounted on a stationary frame 49. There is a corresponding shaft 47, motor 48, and stationary frame 49 for another cutter 11 which is directly in engagement with the cutter 11 seen in FIGURE 3. The rope 46 is traveling between these two cutters 11 as seen in FIGURE 4. The shaft 47 is mounted in bearing block 51 which in turn is mounted on a stationary frame 52 to provide proper support for the cantilevered shaft 47.

The motor 48 rotates the cutter 11 at a speed which is related to the rate of travel of the sheet or rope 46 of dough. The tangential velocity of the cutters 11 is substantially equal to the velocity of the moving rope of dough 46 so that the cutters 11 neither stretch the dough nor cause it to pile up on the cutters 11. If necessary, a gear reduction system may be placed between the motor 48 and the cutter 11 to provide the proper cutter tangential velocity. Such a gear reduction system is well known in the art and has therefore not been shown in the drawings.

At a point where the cylinder 44 or chub of dough leaves the cutters 11, a pair of discs 52 are mounted to grasp the chub 44. The discs 52 are mounted for rotation on shafts 53 which are driven by a motor or motors, (if a connecting gear system is used) which are not shown. The discs 52 rotate in the direction of the arrow shown in FIGURE 3 and grasp a chub 44 coming from between cutters 11 to assist discharge of the chubs 44 and prevent the chubs 44 from clinging to the cutters 11. This positive discharge assistance ensures uniform deposit of the chubs 44 on conveyor 69. The discs 52 are mounted between the cutters 11 as shown in FIGURE 3 so that the dough chub 44 is engaged relatively soon after it is scored and severed by the cutters 11.

A side view of the apparatus may be seen in FIGURE 4 where a rope of dough 46 is introduced between a pair of engaged cutters 11. An input conveyor 61 is utilized to move the rope of dough 46 along the length of its longitudinal axis so that the rope 46 is directed between the cutters 11. The input conveyor 61 is driven by a motor 62 which is connected to shaft 63 of the conveyor pulley 64. In order to maintain control of the rope 46 as it is introduced between the cutters 11, a guard 66 is used to direct the rope 46 into the cutters 11. Correct alignment of the rope 46 with the cutters 11 is necessary since a score 67 is placed into the rope and a uniform scoring of this rope 46 is desirable in the finished product or dough chub 44. There is a guard 66 on either side of the cutters 11 which conforms to the periphery of the cutters, thus providing a guide for the rope until the rope engages the cutters 11.

The cutters 11 rotate in the direction indicated in FIGURE 4. Consequently the scoring blades 13 respectively engage blades on the opposite cutter to score the rope as indicated by the score 67 and the severing blades 14 completely engage each other along the length of their cutting surfaces 21 to sever the rope at predetermined intervals depending upon the length of the cylinder or chub 44 which is needed. As previously noted, discs 52 are placed near the exit of the material from the cutters 11 to assist the discharge of the cylinder or chub 44 as it is leaving the cutters 11. These discs 52 engage the cylinder or chub of dough 44 and direct the chub 44 to the discharge conveyor 69. Motor 71 drives shaft 72 of conveyor 69 to move the pulley 73 and belt 74 in the direction indicated in FIGURE 4. Thus the discharge conveyor 69 removes the chubs 44 at spaced intervals as shown in FIGURE 4 from the cutters 11. The chubs 44 are moved then by the conveyor 69 to a subsequent processing station.

An understanding of the cutting and scoring process which takes place can be best illustrated by reference to FIGURE 5 of the drawings where an enlarged fractional view of the engaged cutters 11 is shown with a rope 46 of dough passing between the cutters. The dough 46 is traveling and discharged from the conveyor 61 in the direction indicated by the arrow in FIGURE 4. The cutters 11 are rotating as indicated by the arrows in FIGURE 5 so that the dough rope passes between the cutters 11 as shown in FIGURE 5. Cutting surfaces 18 of the scoring blades 13 come together and completely sever the dough rope 46. However due to the notch or indentation 17 in the blade 13, a portion of the dough in the central portion of the dough rope 46 remains unsevered so that a cross section of the dough rope 46 taken through the score line produced by the scoring blade 13 appears as shown in FIGURE 6. The dough chub 44 has an outer periphery 77 which remains substantially the same size and shape as the original dough rope 46. However, the dough rope 46 is scored and a portion of the rope 46 in the center of the rope will remain unsevered. This unsevered portion of the rope is generally designated by the numeral 78. Each unsevered portion or web 78 is the connecting web between successive rolls 79 of dough which make up a single chub 44.

Since the dough rope 46 is raw dough, the individual rolls 79 have a tendency to adhere to each other or knit at the score 67. In order to prevent this knitting of the individual rolls 79, oil from the oil system 56 is introduced through the oil channels 22 and passages 23 and 24 of the scoring blade 13 and is deposited in the score 67. Oil which is discharged from the openings 26, see FIGURE 2, in the scoring blades 13 is pumped into manifold 32 by a constant delivery pump 54 which is part of the oil supply system 56. The pump 54 provides a constant and uniform flow of oil from the pump through line 57 to the manifold 32 where the oil is directed into the scoring blades 13 for deposition in the score marks of the dough. An air pump 58 is provided to inject air into the line 57 so that the oil which is discharged from the opening 26 of each scoring blade 13 is more uniformly distributed throughout the score mark in the cylinder or chub of dough. (See FIG. 5.) The oil line 57 may be connected by conventional pipe-type couplings to the manifold 32. The pipe-type couplings 59 connect the line 57 into the slot 34 of the manifold 32 so that oil will be freely distributed in the slot 34 for introduction into apertures 31 in plate 27.

As the scoring blades 13 engage the rope 46, the apertures 31 in the plate 27 come into communication with the slot 34 of the manifold 32, see FIG. 1. With this communication, of the slot 34 with the oil channels and passages, oil is forced from the system 56 through the blades 13 and into each indentation 76 as the score line is made by the scoring blade 13. Deposition of oil, shortening or other similar material prevents the individual rolls 79 from knitting after the cylinder of dough has been discharged from between the cutters 11. With the rolls 79 thus lubricated the housewife or other party interested in severing individual rolls 79 from a chub 44 may merely grasp a single roll 79 and break the web 78 to separate the individual rolls 79 from the chub 44. The individual rolls then can be cooked by the housewife as individual pastry products.

The previously mentioned air pump 58 provides air for forcing the oil from the passages 23 and 24 and uniformly distributes the oil or shortening throughout the surface area of the score line 76 to insure that no knitting of the individual rolls 79 takes place even though the chub 44 may be stored in a compact container for a lengthy period of time. Also, since the oil is under pressure, dough is prevented from entering discharge openings 26, as the dough is scored by the blades 13. The severing blades 14 are spaced about the cutters 11 depending upon the length of the packages into which the individual chubs 44 of dough containing the pastry roll 79 are being packed. Since there is no notch 17 in the cutting surface 21 of the severing blade 14, the severing blade 14 completely severs the dough rope 46. After the chub 44 is severed from the dough rope 46 the discharge discs 52 aid the discharge of the chub 44 from between the cutters 11 and deposit the chubs as noted on the discharge conveyor 69. Since the severing blades 14 completely sever the individual chubs, no lubrication of the final cut is necessary.

The lubrication of the slot 76 and score 67 as it progresses due to the engagement of the score blades 13, is controlled by the length of slot 34. As the apertures 31 which correspond with the particular blade 13 communicate with the slot 34, oil is introduced into the blade 13. The oil from the oil system continues to flow through the scoring blade 13 as long as the associated aperture 31 is in communication with the slot 34 of the manifold 32. However, as the scoring of the dough rope 46 progresses, the aperture 31 moves out of communication with the slot 34 so that as the blades 13 reach the lower most position of the scoring blades illustrated in FIGURE 5, the associated aperture 31 moves out of communication with the slot 34 to terminate the oil flow into the lower most blades 13. Thus the flow of oil is terminated at a particular time to prevent excess oil from flowing out of the scoring blades 13. It can be seen from this explanation that the discharge of oil into the score 67 commences when the scoring blade 13 begins to cut or indent the dough rope 46 and continues to flow while the scoring blade 13 engages the rope 46. However, the flow of oil is terminated when the scoring blade 13 disengages the chub 44.

It is noted that the pockets 16 between the individual blades 13 and 14 tend to mold the individual rolls 79. The essentially cylindrical rope 46 is compressed by cutters 11 so that the dough fills the pockets 16. However, due to the resiliency of the dough involved individual roll 79 acquires a shape similar to that of chub 44 in FIGURE 5 after the individual chub has disengaged the scoring and severing blades 13 and 14 respectively. The apparatus shown in FIGURE 7 of the drawings produces a product similar to that produced by the apparatus shown in FIGURE 5.

The resulting dough chub with the scores 67 is a product which can be conveniently packed in cylindrical type containers in a mass production type system without the need for individual packers. The chub 44 contains a predetermined number of individual rolls 79 which are connected by the web 78 to form a convenient cylinder for packaging purposes. On the other hand the chub 44 contains a number of individual rolls 79 such as Danish rolls which may easily be removed from the cylinder 44 for cooking. Due to the small cross sectional area of the web 78, removal of the individual rolls 79 from the cylinder 44 is very easily accomplished. Additionally since the score mark between the individual rolls 79 is lubricated with a shortening oil, the individual rolls 79 do not knit together while packed in a container.

It is to be understood that the above described arrangements are simply illustrative of the application of the principles of the invention. Numerous other arrangements may be readily devised by those skilled in the art which will embody the principles of the invention and fall within the spirit and scope thereof.

Now, therefore, I claim:

1. A dough forming apparatus comprising a first conveyor for moving a dough rope along the longitudinal axis of the rope, engaged rotary cutters positioned near said first conveyor, each of said rotary cutters having severing blades and scoring blades, said first conveyor advancing the dough rope between said cutters, the scoring blades of each of said cutters contacting along a portion of their length the respective scoring blades of another of said cutters to score the dough rope advanced between the cutters and the severing blades of each of said cutters contacting along their entire length the respective severing blades of another of said cutters to sever sections of the dough rope advanced between the cutters, and means positioned near said engaged cutters for removing scored and severed dough sections from between said engaged cutters.

2. An apparatus in accordance with claim 1 in which said means for removing is a pair of rotary discs positioned to engage said sections between the discs.

3. An apparatus for forming chubs of dough from a rope of dough which comprises a pair of engaged rotary cutters, each of said rotary cutters having scoring and severing blades, the scoring blades of each of said cutters contacting along a portion of their length the respective scoring blades of another of said cutters to score the dough rope advanced between the cutters and the severing blades of each of said cutters contacting along their entire length the respective severing blades of another of said cutters to sever sections of the dough rope advanced between the cutters, each of said scoring blades having oil passages, means for rotating said cutters to score and sever said rope of dough, and means for forcing oil through said oil passages.

4. An apparatus for forming chubs of dough from a rope of dough which comprises a pair of engaged rotary cutters, each of said rotary cutters having scoring and severing blades, the scoring blades of each of said cutters contacting along a portion of their length the respective scoring blades of another of said cutters to score the dough rope advanced between the cutters and the severing blades of each of said cutters contacting along their entire length the respective severing blades of another of said cutters to sever sections of the dough rope advanced between the cutters, each of said scoring blades having oil passages communicating with individual channels in said cutters, an oil supply system, and manifold means interconnecting said cutters and said supply system for selectively directing oil through said channels and passages.

5. An apparatus in accordance with claim 4 in which said manifold means includes a stationary member having a slot communicating with said supply system for selectively directing oil through said channels and passages.

6. An apparatus for forming chubs of dough from a rope of dough which comprises a pair of engaged rotary cutters, each of said rotary cutters having spaced and radially extending scoring and severing blades, the scoring blades of each of said cutters contacting along a portion of their length the respective scoring blades of another of said cutters to score the dough rope advanced between the cutters and the severing blades of each of said cutters contacting along their entire length the respective severing blades of another of said cutters to sever sections of the dough rope advanced between the cutters, each of said scoring blades having oil passages communicating with individual channels in a first side of said cutter, a plate rigidly engaging said first side and having apertures communicating with said channels, an oil supply system, and a manifold interconnecting said plate and said supply system for selectively directing oil through said apertures.

7. An apparatus in accordance with claim 6 which further includes a spring biasing means for forcing said manifold into frictional engagement with said plate.

References Cited by the Examiner

UNITED STATES PATENTS

| | | | |
|---|---|---|---|
| 325,673 | 9/1885 | Guss | 83—170 |
| 1,221,423 | 4/1917 | Dempsey et al. | 107—8 |
| 1,778,483 | 10/1930 | Carroll | 83—345 X |
| 2,232,832 | 2/1941 | Walborn | 107—8 X |
| 2,256,082 | 9/1941 | Feurt | 83—343 X |

FOREIGN PATENTS

| | | |
|---|---|---|
| 3,534 | 1/1916 | Great Britain. |
| 40,987 | 6/1937 | Holland. |

WALTER A. SCHEEL, *Primary Examiner.*

JOSEPH D. BEIN, ROBERT E. PULFREY, *Examiners.*